Figure 1:
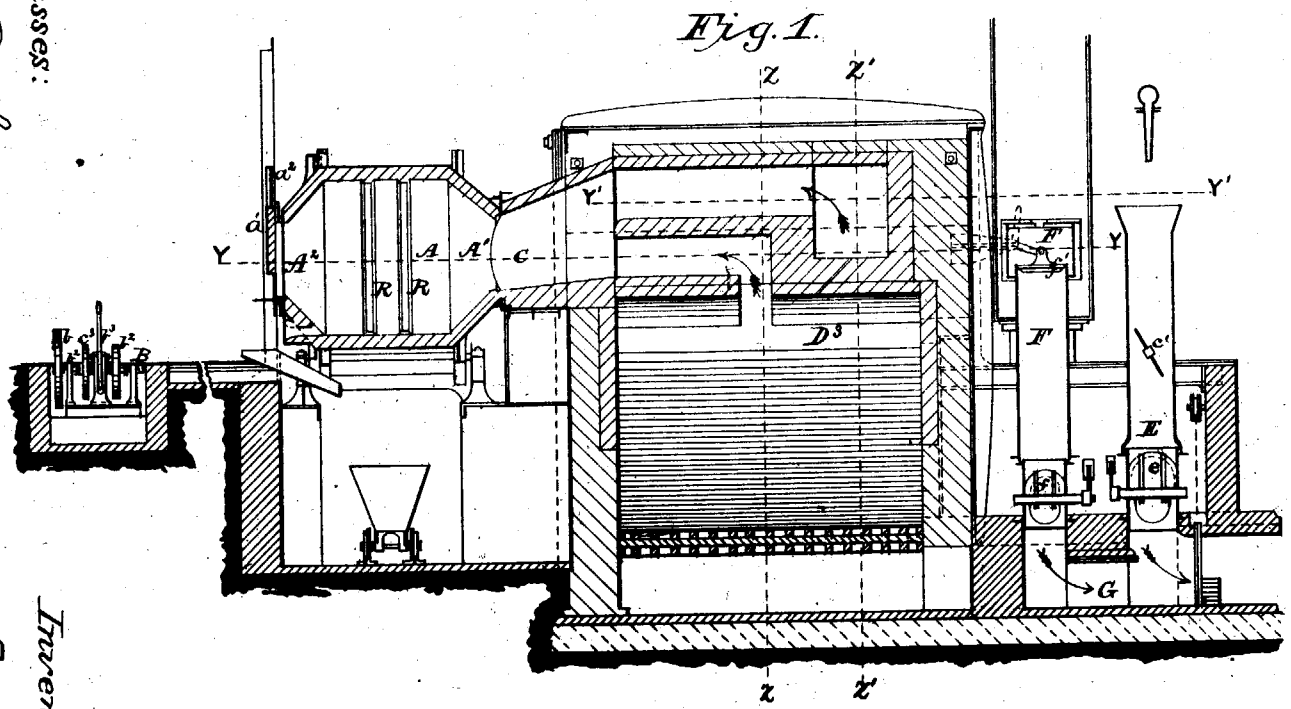

3 Sheets—Sheet 1.

C. W. SIEMENS.

MANUFACTURE OF IRON AND STEEL.

No. 9,833. Reissued Aug. 9, 1881.

Witnesses:

F. M. Burnham

W. B. Shaffer

Inventor:

C. W. Siemens by A. Whitman atty.

3 Sheets—Sheet 2

C. W. SIEMENS.

MANUFACTURE OF IRON AND STEEL.

No. 9,833. Reissued Aug. 9, 1881.

Witnesses:

F. M. Burnham

W. C. Shaffer

Inventor:

C. W. Siemens by C. A. Wickersham atty

C. W. SIEMENS.

MANUFACTURE OF IRON AND STEEL.

No. 9,833. Reissued Aug. 9, 1881.

Witnesses:

J. M. Burnham

W. B. Shaffer

Inventor:

C. W. Siemens by C. Whitman

Atty

UNITED STATES PATENT OFFICE.

CHARLES WILLIAM SIEMENS, OF WESTMINSTER, COUNTY OF MIDDLESEX, ENGLAND.

MANUFACTURE OF IRON AND STEEL.

SPECIFICATION forming part of Reissued Letters Patent No. 9,833, dated August 9, 1881.

Original No. 159,712, dated February 9, 1875. Application for reissue filed December 3, 1880.

DIVISION B.

*To all whom it may concern:*

Be it known that I, CHARLES WILLIAM SIEMENS, a subject of the Queen of Great Britain, residing at Westminster, in the county of Middlesex, England, have invented certain new and useful Improvements in effecting the Separation of Metallic Iron from Ores and the Manufacture of Iron; and I do hereby declare that the following is a full, clear, and exact description of the invention, which will enable others skilled in the art to which it appertains to make and use the same.

It has long been known that oxygen combined with iron can be disassociated from the oxides of that metal by placing solid carbon in contact therewith in a heated retort, and excluding air or other oxygen during the process of reduction. Iron ores have also been reduced in revolving cylinders, drums, or muffles. Thus in Letters Patent of the United States, issued to me on the 17th day of August, 1869, a revolving cylinder lined with fire-brick and heated by means of flues in the lining is described as being used for this purpose. This furnace consisted of a long cylindrical tube of iron mounted upon anti-friction rollers and having a brick lining provided with passages for heating currents. The ore to be reduced, mixed with reducing agents and fluxes, was fed in at one extremity of the rotating cylinder and worked gradually forward by its rotation, while at the same time it was heated to redness by the heated lining of the cylinder. Reducing-gas was made to enter the cylinder, and being brought extensively into contact with the heated and moving ore during the slow rotation of the furnace, effected its reduction into spongy pulverulent iron. The methods of effecting the separation of iron directly from the ores of that metal have, however, heretofore proved commercially unsuccessful for various reasons, among which may be mentioned the difficulty of conducting heat to all parts of the material to be treated; the liability of spongy metal produced to absorb sulphur from the heating-gases, and the impediments to the successful application of the reduced ores after their conversion into spongy metal. I have found, however, that in melting iron ores no sulphur is absorbed from the flame, and that by melting ores mixed with fluxing materials in a furnace so arranged as to accomplish fusion in a continuous manner on a large scale the fused ores may be acted upon by a solid carbonaceous matter, so as to separate the metallic iron, while the earthy constituents of the ore form a fusible slag with the fluxing material. I have also found that this reduction by precipitation of the iron can only be accomplished at an intense heat, exceeding the welding-heat of iron, but that the iron so produced is almost chemically pure, although the ores and the fuel used contain a considerable percentage of sulphur and phosphorus. As, however, the accomplishment of these results would require a great amount of manual labor and involve the exercise of care and skill, it is necessary, if iron is to be produced largely by this direct process, that some self-acting or mechanical mode of working it be devised.

The object of my present invention is the realization, in a practical and economical manner, of these results; and to that end I effect the separation of metallic iron from its ore by exposing the ore mingled with fluxing materials and carbonaceous matter to intense heat, while imparting to such mixture the motion incidental to the revolution of the combustion-chamber containing it. I also expose the ore mingled with fluxing materials and carbonaceous matter to the motion incidental to the slow revolution of the heated combustion-chamber containing the mixture until the metallic particles are separated from the ore, and then subject the mixture to a more rapid rotation for the purpose of forming the separated metal into balls. I also expose the ore mingled with fluxing materials and carbonaceous matter to intense heat while imparting to such mixture the motion incidental to the rotation of the combustion-chamber containing it, and then effect the combustion of the carbonic oxide produced by the reaction of the carbonaceous matter on the ore by supplying thereto highly-heated air.

In reducing my invention to practice I prefer to employ a rotative regenerative gas-furnace constructed and arranged as shown in the accompanying drawings, in which—

Figure 2:
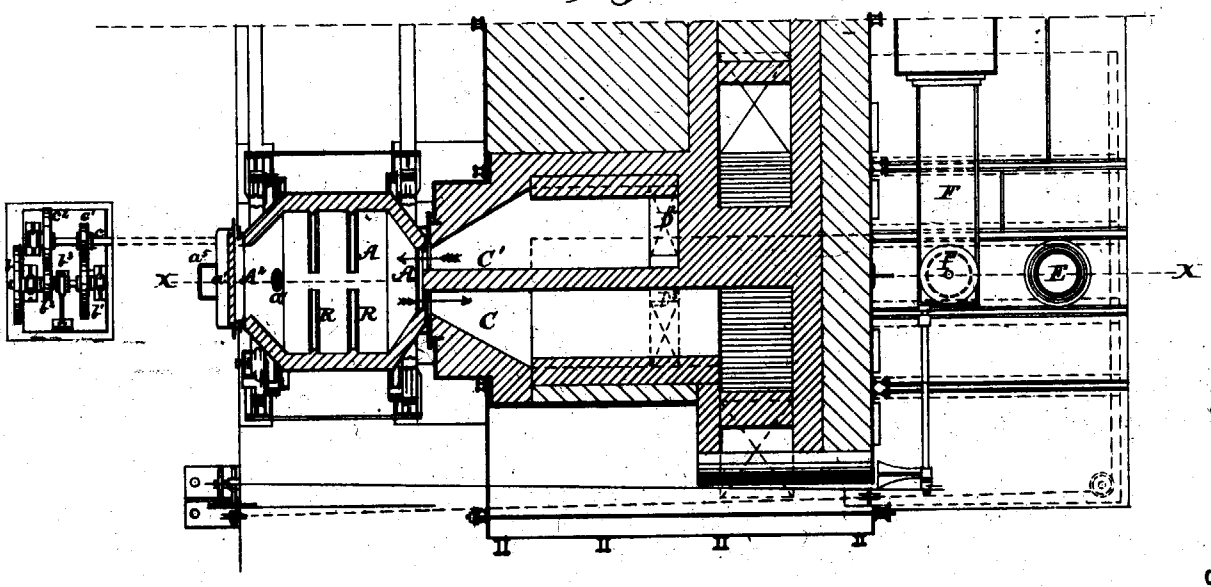
Figure 3:
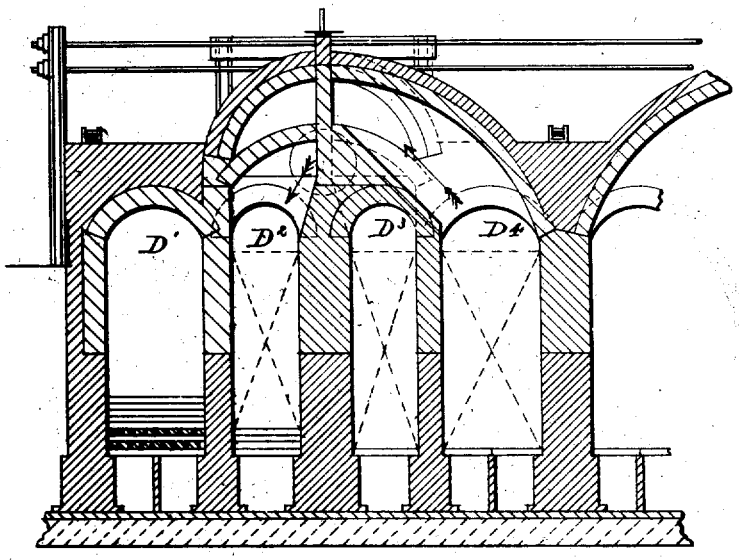
Figure 4:
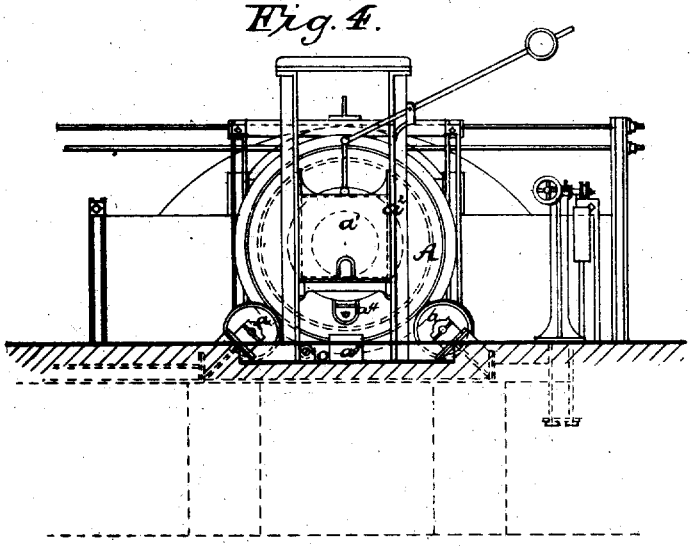

Figure 1 represents a longitudinal section on line $x\ x$ of Fig. 2. Fig. 2 represents a sectional plan on lines $y\ y\ y'\ y'$ of Fig. 1. Fig. 3 represents, on the left-hand side, a half-transverse section on the line $z\ z$ of Fig. 1, and on the right-hand side a half-transverse section on the line $z'\ z'$ of Fig. 1, and Fig. 4 shows a front view.

A is the rotative furnace, in shape cylindrical, with truncated conical ends. It is mounted on rollers $a\ a$, which are caused to revolve by gearing B, driven by any suitable power. The gearing B is arranged with clutch apparatus, so that the furnace can be rotated at either the slow or quick speed above referred to, or brought to rest, while the prime mover continues to work at its regular speed. For this purpose the gearing B consists of a wheel, $b'$, and pinion $b^2$, loose on the shaft of the driving-wheel $b$, and gearing respectively with pinion $c'$ and wheel $c^2$ on shaft $c$, which drives the rollers $a$. By means of a clutch, $b^3$, either the wheel $b'$ or the pinion $b^2$ is geared with the driving-shaft, and thus a slow or quick speed is imparted to the rotative furnace; or by throwing the clutch out of gear the furnace is brought to rest. The throat of the furnace, $A'$, is in communication with two flues, C and $C'$, each of which has two branches communicating respectively with two of four regenerative chambers, $D'\ D^2\ D^3\ D'$ The outer regenerative chambers, $D'\ D^4$, are for heating the air, and the two inner chambers, $D^2$ and $D^3$, are for heating the gas supplied to the furnace.

The air is supplied by a main duct, E, provided with a reversing-valve, $e$, by which the supply can be turned toward either of the chambers $D'$ or $D^4$, and the throttle-valve $e'$, whereby the supply can be regulated.

In order to increase the flow of air when intense heat is required in the furnace, a jet of compressed air, $e^2$, is introduced from a blast-pipe into the middle of the duct E.

The gas from the main supply-trunk F is introduced by a duct, $F'$, which is provided with a stop-valve, $f'$, and with a reversing-valve, $f$, whereby the gas can be directed to either of the chambers $D^2$ or $D^3$. The air and gas thus supplied to the two regenerative chambers on the one side of the structure flow thence, heated, into one of the flues, C or $C'$, where they mingle and produce a powerful flame, which plays into and sweeps around the furnace A, the products of combustion escaping by the other flues, C or $C'$, through the other two regenerative chambers, and thence by a flue, G, to the chimney or other outlet. When one of the two pairs of regenerative chambers has been sufficiently heated by the escaping products of combustion, and the other pair cooled by passage of the incoming air and gas through them, the valves are moved, so as to alter the direction of the inflowing and outflowing currents, in the manner well understood in reference to the working of regenerative gas-furnaces.

At the end $A^2$ of the furnace opposite the throat is mounted, between the guides $a^2$, a vertically-sliding door, $a'$, with a counterbalance-weight, $a^3$. At the front of the furnace is formed a tap-hole, $a^4$, which can be plugged with refractory material, and under this there is a chute, $a^5$, by which material tapped from the furnace can be run into forms or molds, or into a truck in a pit below the furnace.

The lining of the furnace A may be of any known suitable refractory material that is not readily affected by scoria; but I prefer to use for it a lining formed in the following manner: I take the mineral known as "bauxite," consisting chiefly of alumina, with a proportion of peroxide of iron. I calcine it and reduce it to powder, and mix with it from ten to fifteen per cent. of powdered plumbago, graphite, or other carbonaceous matter in a dense form, and such a quantity of argillaceous clay or other binding material as is necessary to give cohesion. I form this mixture into bricks or blocks of suitable form, and burn them in a kiln in the usual way. In burning such bricks the oxide of iron contained in the bauxite is converted by the carbonaceous matter into metallic iron, and a very refractory material is thus produced, capable of resisting the action of scoria for a considerable time. These bricks may be built inside the rotating furnace, with cement made from the above-named mixture used in an unburned condition; but I prefer to build them in loosely, and, after heating the furnace to a white heat, to charge it with pure ore or hammer-slag while rotating slowly. The ore or slag is melted and sinks into the crevices between the bricks, serving as a cement which binds them firmly together, and also as a glaze which prevents access of air to the interior of the bricks. When the bricks are so cemented the excess of fused ore or slag is tapped off and the furnace is ready for work.

Having thus described a rotative regenerative furnace which may be employed, I will proceed to explain my improvements in the manufacture of iron.

The ore to be treated is crushed and mixed with a suitable proportion of lime, manganese, or other fluxing material, according to the relative amount and nature of the gangue which the ore contains, in order to form a fluid scoria; or a mixture of ores may be employed which produces a fusible slag without admixture of lime or other fluxing material. The mixed material is introduced into the slowly-rotating furnace A by way of the door $a'$ and heated nearly to the fusing-point of the ore, whereupon is added a quantity of the reducing agent, such as coal or anthracite or coke, previously crushed but not ground fine, or charcoal or wood previously dried and cut into pieces. The proportion of carbonaceous matter required for the conversion of a certain quantity of ore depends upon the richness of the ore and upon the nature of the carbonaceous matter employed, as well as on the nature of the iron to be produced. In each case the proportions should be determined by experience, but under ordinary circumstances about half a ton of solid carbonaceous matter to a ton of metal to be produced would be sufficient. If the reducing agent employed be anthracite or hard coke, it may be crushed moderately fine and charged into the furnace with the ore and heated simultaneously therewith. By the slow rotation of the furnace the carbonaceous matter becomes covered by the heated ore, with which it is gradually mingled, while fresh intensely-heated surface is being continually presented to the mixture. A very powerful reaction is thus produced, and a quantity of carbonic oxide is evolved, which, in burning with the highly-heated air supplied from the regenerator, nearly suffices to maintain intense heat in the furnace without necessitating the admission of additional gaseous fuel. The reduction of the ore under these conditions is effected rapidly, the gangue combining with the fluxing material so as to form a fusible slag, and the rotation of the furnace being very slow, (from four to six revolutions per hour,) the particles of metallic iron in the course of separation are not prematurely agglomerated. When the reaction is complete the rotation of the furnace is stopped and the scoria is tapped off, so as to liberate the metallic iron resulting from the reaction. A fuller supply of gaseous fuel is then turned on, and the furnace is caused to rotate five or six times more rapidly than before. This more rapid rotation has the effect of agglomerating the iron into balls, which may be taken out of the furnace and subjected to the action of squeezers, hammers, or rolls for the production of wrought-iron or puddled steel.

In order to produce several balls of moderate size, instead of one large ball, which would be inconvenient to handle, I form internally-projecting circular ribs R in the lining of the furnace, which have the effect of dividing the mass during balling into several portions. A portion of these ribs is omitted in line of the tap-holes, (shown in Fig. 2,) so that there may be a clear passage for material to flow toward the front of the furnace when the tap-hole is hole is opened.

Having thus described the nature of my invention, I claim and desire to secure by Letters Patent—

1. The process of effecting the separation of metallic iron from its ore, which consists in exposing the ore mingled with fluxing materials and carbonaceous matter to intense heat while imparting to such mixture the motion incidental to the revolution of the combustion-chamber containing it, as herein described.

2. The improvement in the process of effecting the separation of metallic iron from its ore, which consists in exposing the ore mingled with fluxing materials and carbonaceous matter to the motion incidental to the slow revolution of the heated combustion-chamber containing the mixture until the metallic particles are separated from the ore and then subjecting the mixture to a more rapid rotation for the purpose of forming the separated metal into balls, as herein described.

3. The improvement in the process of effecting the separation of metallic iron from its ore, which consists in exposing the ore mingled with fluxing materials and carbonaceous matter to intense heat while imparting to such mixture the motion incidental to the rotation of the combustion-chamber containing it and then effecting the combustion of the carbonic oxide produced by the reaction of the carbonaceous matter on the ore by supplying thereto highly-heated air, as herein described.

C. WILLIAM SIEMENS.

Witnesses:
GEO. WOOLLETT,
H. T. THRUPP,
*Both clerks to Ridgway Bros., 2 Waterloo Place, Pall Mall, London, Notaries.*